US006820892B2

(12) United States Patent
Yokoyama

(10) Patent No.: US 6,820,892 B2
(45) Date of Patent: Nov. 23, 2004

(54) AIR BAG APPARATUS FOR VEHICLE

(75) Inventor: Aki Yokoyama, Fuji (JP)

(73) Assignee: Nihon Plast Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/026,277

(22) Filed: Dec. 19, 2001

(65) Prior Publication Data
US 2002/0043787 A1 Apr. 18, 2002

(30) Foreign Application Priority Data

Dec. 19, 2000 (JP) ........................................ P2000-385734

(51) Int. Cl.[7] .............................................. B60R 21/16
(52) U.S. Cl. ..................... 280/728.2; 280/740; 280/742
(58) Field of Search ................................ 280/742, 740, 280/728.2, 732

(56) References Cited

U.S. PATENT DOCUMENTS

| 5,332,256 A | * | 7/1994 | Lauritzen et al. ........ 280/728.2 |
| 5,518,266 A | | 5/1996 | O'Docherty et al. |
| 5,564,730 A | | 10/1996 | Chizenko et al. |
| 5,718,447 A | * | 2/1998 | Rose et al. ............... 280/728.2 |
| 5,772,241 A | | 6/1998 | Heilig |
| 5,839,751 A | * | 11/1998 | Lutz ........................ 280/728.2 |
| 5,851,023 A | * | 12/1998 | Nagata et al. ........... 280/728.3 |
| 6,056,313 A | * | 5/2000 | Lutz et al. ............... 280/728.1 |
| 6,082,765 A | * | 7/2000 | Bowers et al. ............. 280/742 |
| 6,149,192 A | * | 11/2000 | Swann et al. .............. 280/740 |
| 6,155,599 A | * | 12/2000 | Bowers et al. ............. 280/740 |
| 6,338,499 B2 | * | 1/2002 | Ueno et al. ................ 280/732 |
| 6,394,485 B1 | * | 5/2002 | Amamori ................. 280/728.2 |

FOREIGN PATENT DOCUMENTS

| DE | 42 33 751 A1 | 4/1994 |
| DE | 198 57 213 A1 | 2/2000 |
| EP | 0 930 203 A2 | 7/1999 |

* cited by examiner

Primary Examiner—Ruth Ilan
(74) Attorney, Agent, or Firm—Brenda O. Holmes; Kilpatrick Stockton LLP

(57) ABSTRACT

An air bag apparatus for a vehicle according to the invention is provided with an inflator discharging gas, a folded air bag deployed by said discharged gas, a case storing the folded air bag therein, and a retainer fixing the air bag to the peripheral edge of the opening in a state of holding the end portion of the air bag therebetween. The peripheral edge of the opening forms an upward standing flange, and the flange seals off the end portion of the air bag from said discharged gas.

9 Claims, 5 Drawing Sheets

AIR BAG APPARATUS FOR VEHICLE

BACKGROUND OF THE INVENTION

1. Field of the Invention

The present invention relates to an air bag apparatus for a vehicle, and more particularly to an air bag apparatus for a vehicle which reduces an influence of heat applied to the air bag.

2. Description of the Related Art

An air bag apparatus for securing a safety of a passenger at a time of colliding is mounted in a vehicle, for example, to a front passenger's seat side of an instrument panel. The air bag apparatus is structured such that when the vehicle collides, an air bag pushes and breaks a lid on an upper surface of the instrument panel in a moment of time so as to deploy, thereby preventing an upper body of the passenger from colliding with the instrument panel or a front glass. As a related art, there has been disclosed Japanese Patent Application Laid-Open No. 11-321510.

SUMMARY OF THE INVENTION

According to the related art mentioned above, a folded air bag is stored in a case having an open end in an upper portion, and an opening is provided on a bottom surface of the case. A retainer having an opening is mounted from the above to a peripheral edge of the opening. An end portion of the air bag is held between the retainer and the peripheral edge of the opening so as to be fixed thereto. An inflator is mounted facing to an inner side of the air bag, and gas discharged out from the inflator is introduced to an inner portion of the air bag from the opening so as to deploy the air bag upward.

In a case of the related art, because the end portion of the air bag is in a state to be confronted with the opening, in a case where said gas with high temperature and high pressure is discharged from the inflator to the opening, there is a possibility that the end portion of the air bag is influenced with the heat of said discharged gas (deterioration of fibers by the heat). Therefore the end portion of the air bag (especially in a vicinity of a mounting port) needs a special reinforcement by comparison with the other portions so that a manufacture of the air bag requires difficult labors.

The present invention is performed from a view of the problem of the related art and provides an air bag apparatus for a vehicle whose end is hardly influenced by a heat of discharged gas.

According to a first aspect of the present invention, a folded air bag is stored in a case having an open end, and an opening is provided on a surface opposite to the open end of the case. A peripheral edge of an opening is formed as a flange protruding toward an inside of the case, and a retainer having a plurality of rectangular openings is mounted from the inside of the case. An end portion of the air bag is held between the retainer and the peripheral edge of the opening so as to be fixed thereto. An inflator is mounted facing to an inner side of the air bag, and the gas discharged out from the inflator is introduced to an inner portion of the air bag so as to deploy the air bag through the open end. The flange extends higher than the end portion of the air bag.

Since the flange protects the end portion of the air bag from a heat of said discharged gas, it is not necessary to reinforce the end portion of the air bag excessively and it is easy to manufacture the air bag. Further, since the flange has an operation of introducing said discharged gas into the inner portion of the air bag without disturbing a flow current of said gas, it is possible to more securely achieve a smooth expansion of the air bag. Further, since the flange increases a rigidity of the peripheral edge portion of the opening, it is possible to make the case thin, so that it is possible to lighten the air bag apparatus.

According to a second aspect of the present invention, in addition to the structure according to the first aspect mentioned above, the retainer comprises a covering surface fitted to the flange and the end portion of the air bag is curved along the flange and is fixed not only between the retainer and the peripheral edge of the opening but also between the retainer and the flange.

According to the second aspect of the present invention, since an area in which the end portion of the air bag is held is relatively large and the end portion of the air bag is held in a curved state, the end portion of the air bag is hard to be drawn out even when the tension is applied.

According to a third aspect of the present invention, in addition to the structure according to the first aspect mentioned above, a plurality of gas injection holes of the inflator exists near a center of the opening of the case. Since it is possible to make the opening and the retainer smaller, it is possible to make the air bag apparatus compact.

According to a fourth aspect of the present invention, in addition to the structure according to the first aspect mentioned above, a bracket comprising one or more grooves on an inner surface thereof is fixed to the lower surface of the case so that the bracket and the retainer surround the inflator. Said discharged gas is effectively conducted to the air bag.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
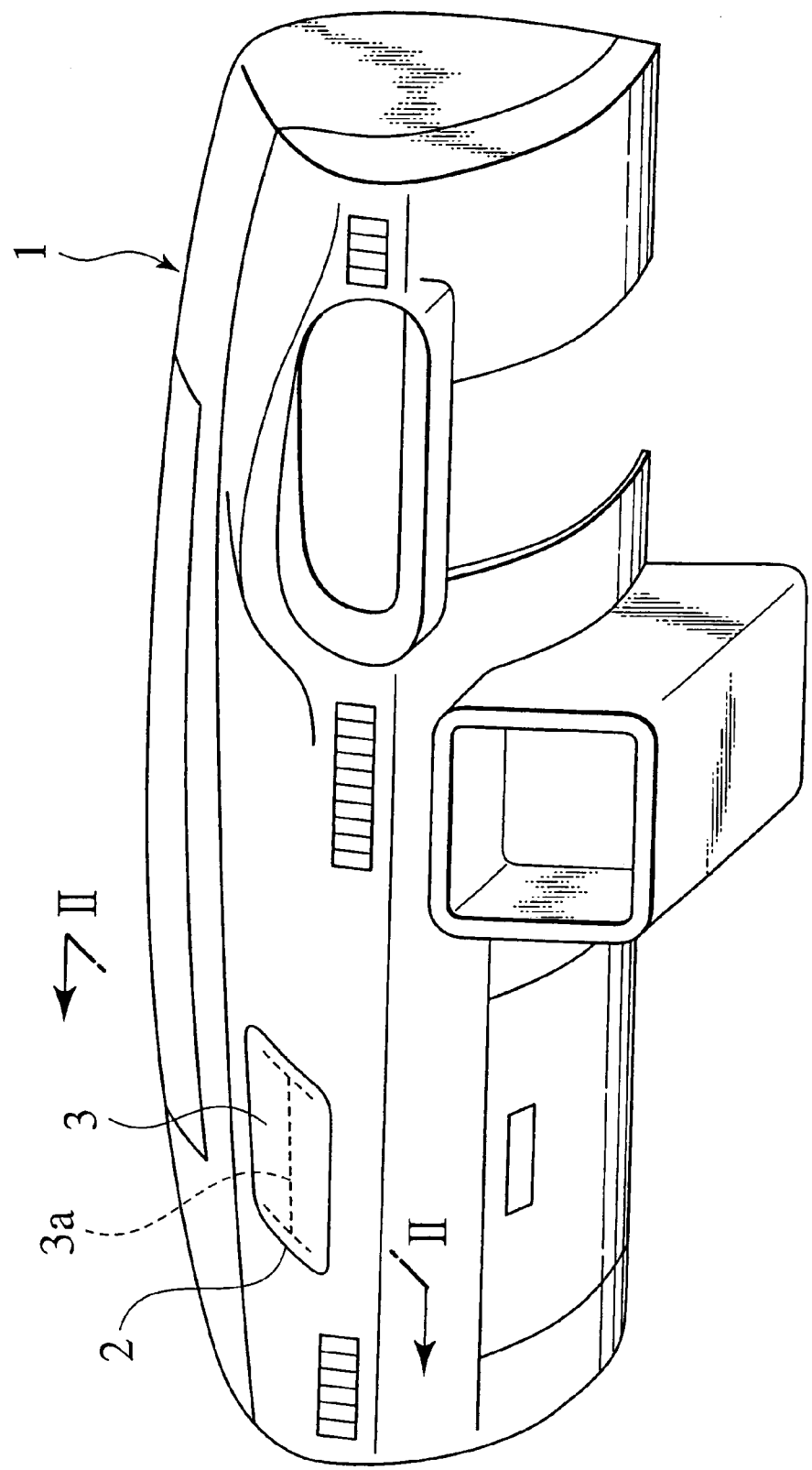
FIG. 1 is a perspective view showing a state of attaching an air bag apparatus according to the present invention to an instrument panel.
Figure 2:
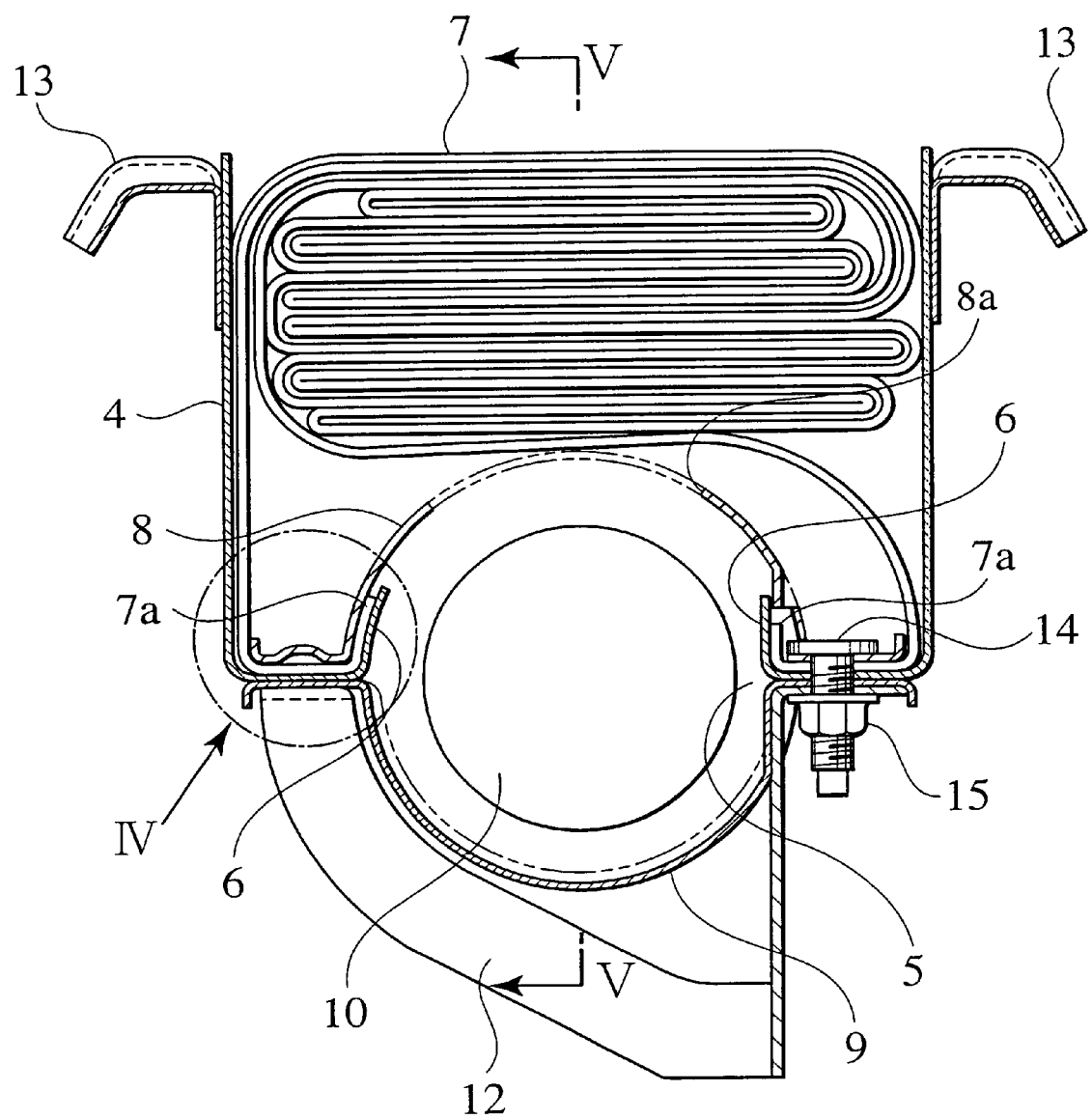
FIG. 2 is a cross sectional view of an air bag apparatus according to an embodiment of the present invention along a line II—II in FIG. 1.
Figure 3:
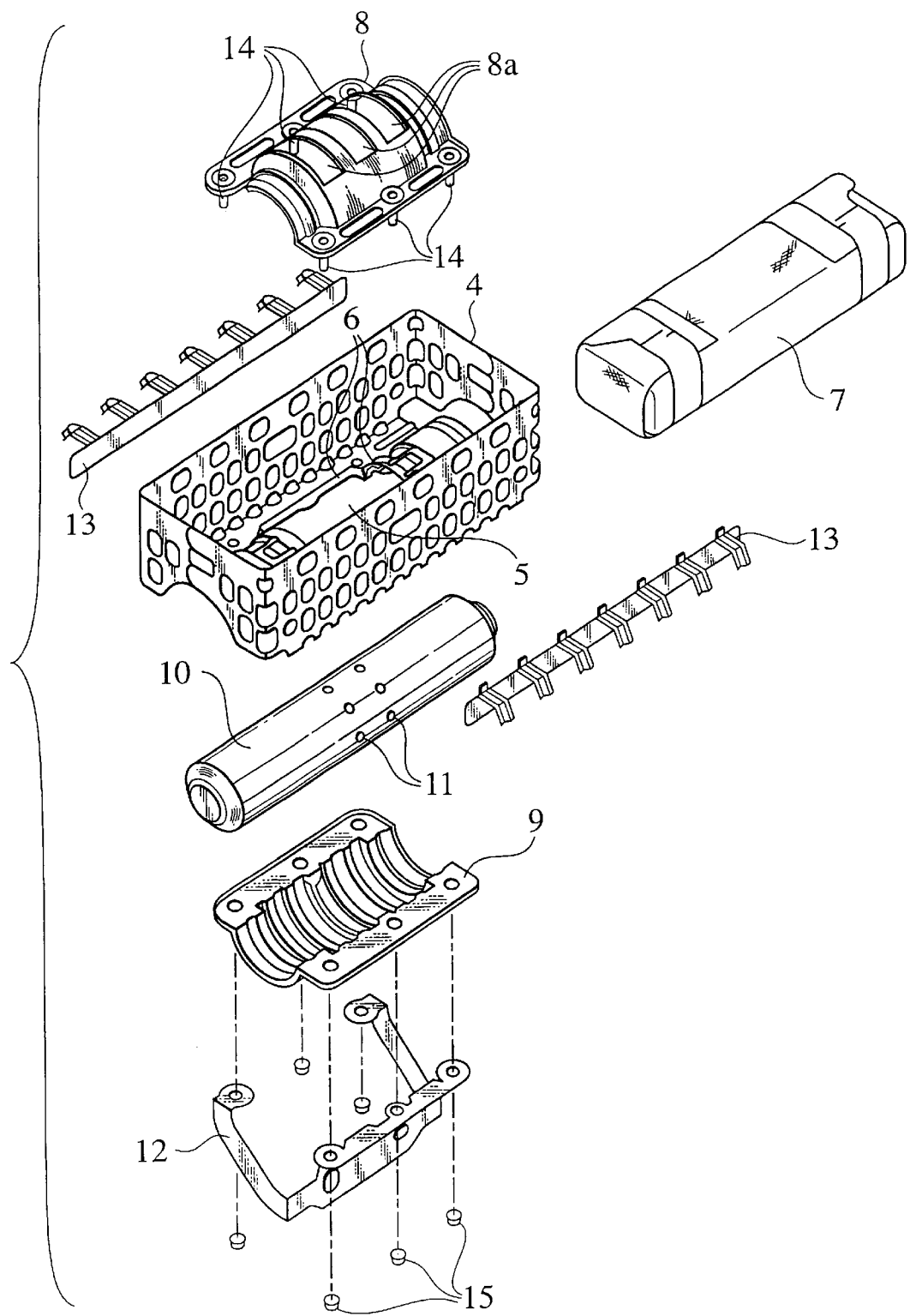
FIG. 3 is an exploded perspective view of the air bag apparatus according to the embodiment of the present invention.
Figure 4:
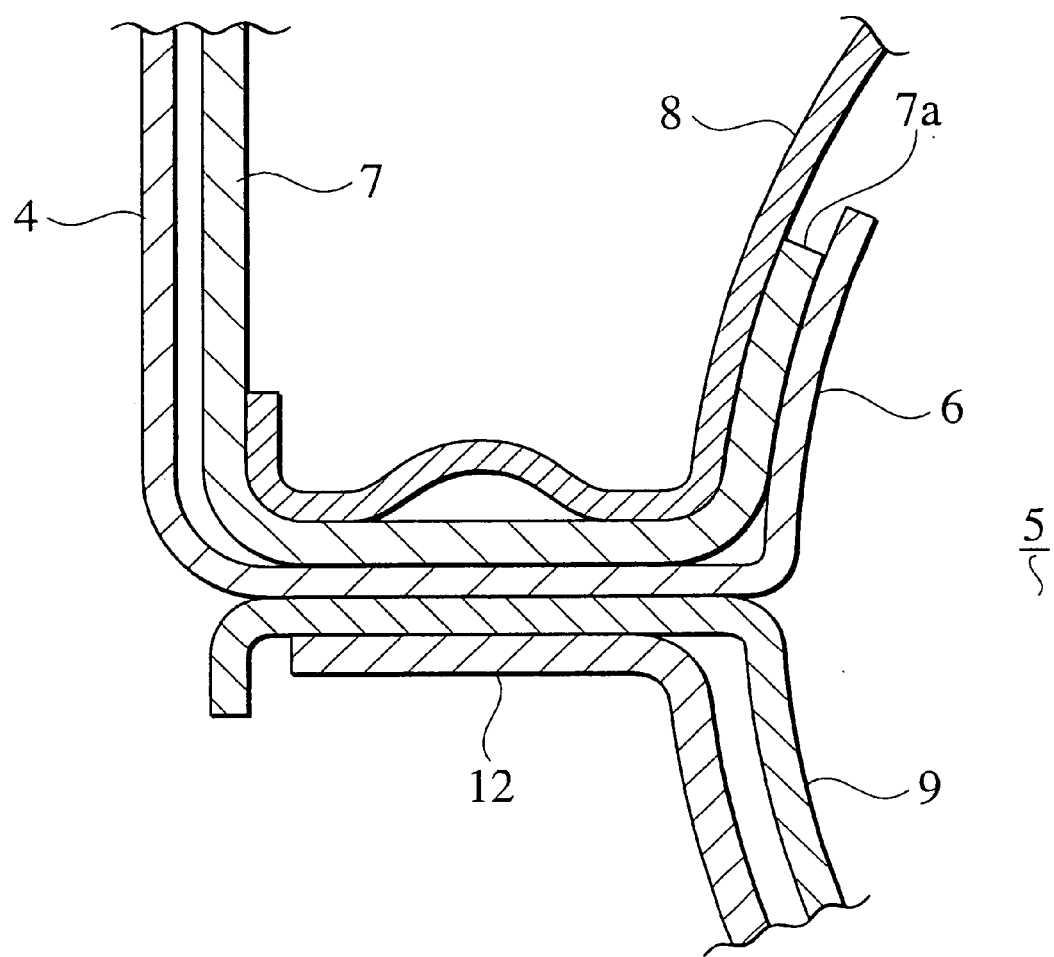
FIG. 4 is an enlarged sectional view of a portion shown by a circle IV in FIG. 2.
Figure 5:
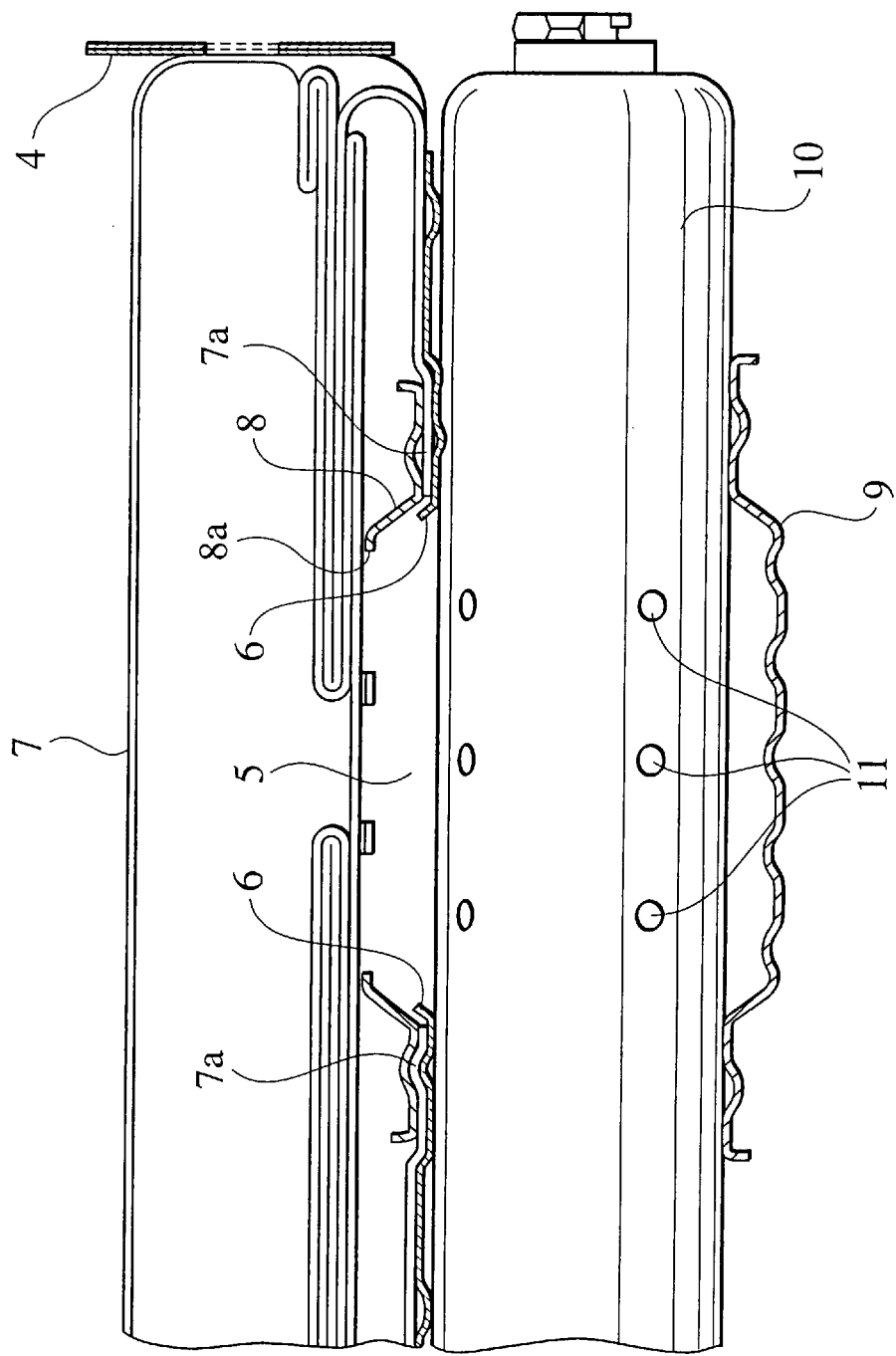
FIG. 5 is a cross sectional view along a line V—V in FIG. 2.

FIG. 1 shows an instrument panel 1 placed in a front portion within a passenger's compartment. A lid 3 breakable in a shape of letter 'H' is fitted to an aperture 2 on an upper surface of the instrument panel 1.

A case 4 formed by a sheet metal is fixed to an inner portion of the aperture 2. The case 4 is formed in a box shape having an open upper end. An opening 5 is pierced rectangularly on a bottom surface of the case 4. An edge of the opening 5 is bent toward so as to form a flange 6.

A folded air bag 7 is stored in an inner portion of the case 4. A retainer 8 is mounted to a peripheral edge of the opening 5 from the inside of the case 4. Three rectangular openings 8a are opened to an upper side of the retainer 8. An end portion 7a of the air bag 7 is held between the retainer 8 and the peripheral edge of the opening 5 so as to be fixed. Further, the end portion 7a of the air bag 7 is held between the flange 6 and the retainer 8 along a longitudinal line of the opening 5 so as to be fixed. Since the flange 6 extends higher than the end portion 7a of the air bag, the end portion 7a of the air bag 7 is not directly exposed to said discharged gas.

Since the end portion 7a of the air bag 7 is also held between the flange 6 and the retainer 8, an area in which the end portion 7a of the air bag is held is increased, so that the air bag 7 can be more securely fixed. Since the portion held by the flange 6 and the retainer 8 is bent from the portion held by the peripheral edge of the opening 5 and the retainer 8, the end portion 7a of the air bag 7 is harder to be drawn out.

An inflator 10 is arranged so as to be faced to an inner side of the air bag 7 and is fixed by a bracket 9. The inflator 10 is formed in a cylindrical shape, and is arranged in parallel to a longitudinal direction of the opening 5. The inflator 10 is provided with a plurality of gas injection holes 11 substantially in a center in a longitudinal direction thereof. The gas injection holes 11 are positioned substantially at a center with respect to the opening 5. The bracket 9 is curved so as to surround a lower side of the inflator 10 and comprises a plurality of grooves toward the opening 5 on an inner surface thereof. Said gas going to flow around the lower side of the inflator 10 is introduced to the opening 5 by the bracket 9.

A fixing metal fitting 12 is further mounted to a lower side of the bracket 9, and is further fixed to a vehicle body reinforcing member (not shown). Another reinforcing member 13 is also mounted to a side surface of the case 4.

The case 4, the retainer 8, the bracket 9 and the fixing metal fitting 12 mentioned above are fastened by a weld bolt 14 previously attached to the retainer 8 and a nut 15. A fastening force of the nut 15 corresponds to a force holding the end portion 7a of the air bag 7.

When the vehicle collides, a signal is transmitted to the air bag apparatus mentioned above from a collision sensor (not shown). Then, a combustible reagent within the inflator 10 burns, and gas having a high temperature and a high pressure is discharged out from the gas injection holes 11. Said discharged gas is introduced into an inner portion of the air bag 7 through the opening 8a of the retainer 8 so as to deploy the air bag 7. The deployed air bag 7 pushes and breaks the lid 3 so as to deploy within the passenger's compartment. The deployed air bag 7 receives and holds an upper body of the passenger going to tilt down to a forward portion of the vehicle.

According to the embodiment of the present invention as mentioned above, since the flange 6 protects the end portion 7a of the air bag 7 from said discharged gas, it is possible to preserve the end portion 7a of the air bag 7 from the influence of heat. Further, the end portion 7a of the air bag 7 is fixed not only between the retainer 8 and the peripheral edge of the opening 5 but also between the retainer 8 and the flange 6. Since the area in which the end portion 7a of the air bag 7 is held is relatively large and the end portion 7a of the air bag 7 is held in the curved state, the end portion 7a is hard to be drawn even when the tension is applied. Accordingly, it is not necessary to reinforce the end portion 7a of the air bag 7 severely and it is easy to manufacture the air bag 7. Since the flange 6 has an operation of introducing said discharged gas into the inner portion of the air bag 7 without disturbing the flow current of the gas, it is possible to more securely obtain a smooth expansion of the air bag 7. Further, since the flange 6 increases a rigidity of the peripheral edge of the opening 5, it is possible to make the case 4 thin, so that it is possible to lighten the air bag apparatus.

According to the embodiment of the present invention as mentioned above, further, the gas injection holes 11 of the inflator 10 are arranged near the center of the opening 5 in the case 4. Since the opening 5 and the retainer 8 can be made smaller, it is possible to make the air bag apparatus compact.

The contents of Japanese Patent Application No. 2000-385734 (filed Dec. 19, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An air bag apparatus for a vehicle comprising:
   a case comprising an open end, a surface opposite to the open end comprising an opening and a flange standing inward from a peripheral edge of the opening;
   a folded air bag stored in the case, having an end portion connected to the peripheral edge of the opening on the inside of the case; and
   a retainer fixed to the peripheral edge of the opening on the inside of the case holding the end portion of the air bag therebetween,
   an inflator facing an inner side of the air bag for discharging gas to deploy the air bag;
   wherein the flange and the end portion of the air bag extend upwardly and the flange extends higher than the end portion of the air bag.

2. An air bag apparatus for a vehicle according to claim 1,
   wherein the retainer comprises a covering surface fitted to the flange.

3. An air bag apparatus for a vehicle according to claim 2,
   wherein the end portion of the air bag is curved along the flange and is further held between the covering surface of the retainer and the flange.

4. An air bag apparatus for a vehicle according to claim 1,
   wherein the inflator comprises one or more gas injection holes positioned substantially at a center of the opening.

5. An air bag apparatus for a vehicle according to claim 1, further comprising:

a bracket fixed to an outer side of the surface opposite to the open end of the case so that the bracket and the retainer surround the inflator.

6. An air bag apparatus for a vehicle according to claim 5, wherein the bracket further comprises one or more grooves on a surface opposite to the inflator thereof so that said gas is conducted to the opening.

7. An air bag apparatus for a vehicle according to claim 1, wherein the end portion of the air bag is curved along the flange.

8. An air bag apparatus for a vehicle according to claim 5, wherein the end portion of the air bag faces to space formed between the retainer and the bracket and the retainer further comprises openings for introducing the gas into the air bag.

9. An air bag apparatus for a vehicle comprising:

a case comprising an open end, a surface opposite to the open end comprising an opening and a flange standing inward from a peripheral edge of the opening;

a folded air bag stored in the case, having an end portion connected to the peripheral edge of the opening on the inside of the case;

a retainer fixed to the peripheral edge of the opening on the inside of the case holding the end portion of the air bag therebetween;

an inflator facing an inner side of the air bag for discharging gas to deploy the air bag; and a bracket fixed to an outer side of the surface opposite to the open end of the case so that the bracket and the retainer surround the inflator, the bracket comprising one or more grooves on a surface opposite to the inflator thereof so that the gas is conducted to the opening, wherein the flange extends upwardly and extends higher than the end portion of the air bag.

* * * * *